Feb. 4, 1930.  S. COHN  1,745,476
MEANS FOR CUTTING STRIPS OF MATERIAL
Filed Feb. 10, 1928  2 Sheets-Sheet 1

INVENTOR
Samuel Cohn
BY Charles G. Hensley
ATTORNEY

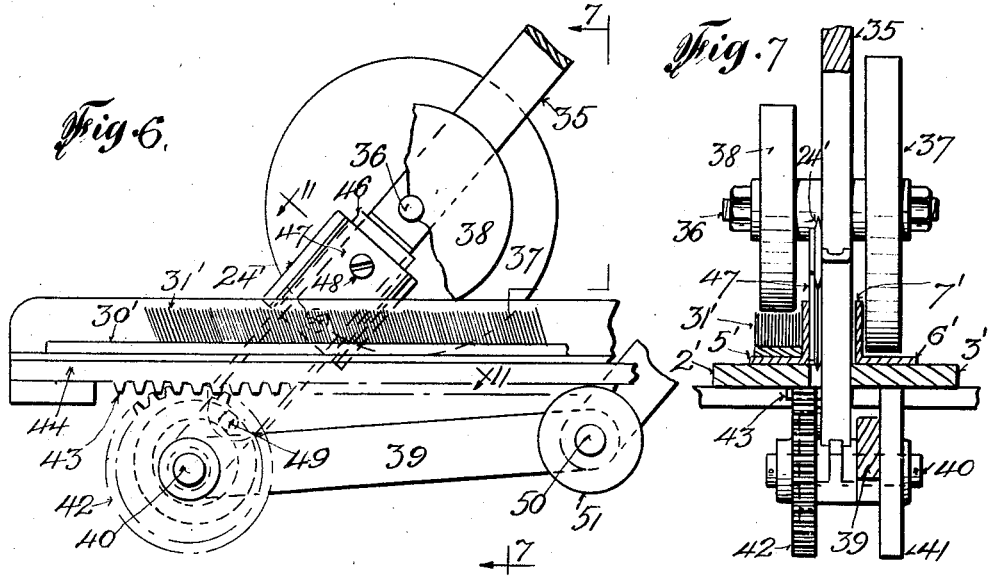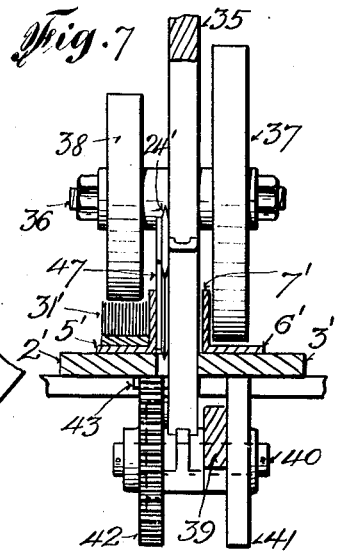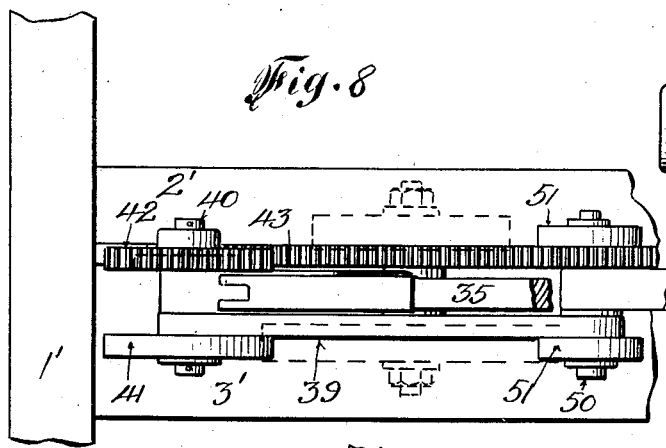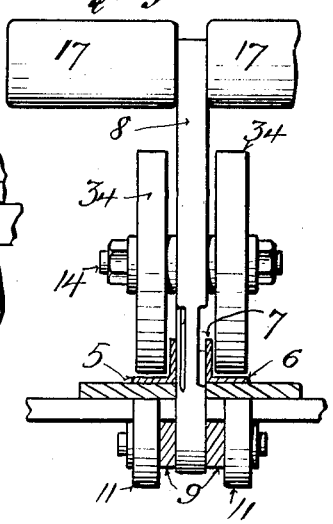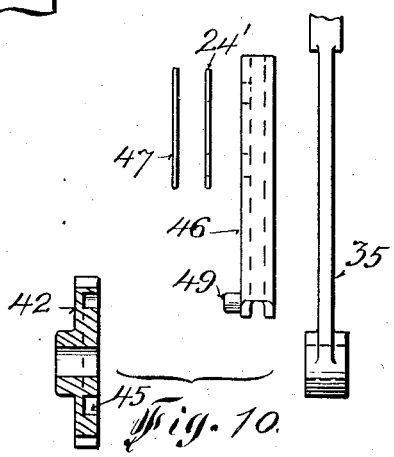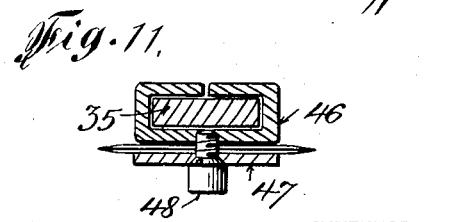

Patented Feb. 4, 1930

1,745,476

UNITED STATES PATENT OFFICE

SAMUEL COHN, OF NEW YORK, N. Y.

MEANS FOR CUTTING STRIPS OF MATERIAL

Application filed February 10, 1928. Serial No. 253,428.

The object of my invention is to provide a simple device for cutting strips or sheets of material, such as textile fabric, and for holding the material stretched across the path of the knife during the cutting operation. In the operation of certain types of machines, especially machines for drying long strips of knitted tubular fabric, it is necessary, after a body of the material has been wound upon the roller, to sever the strip of fabric and to start the new end upon another winding roller. It is difficult, owing to the stretchable nature of knitted fabric, to quickly sever it in a straight line across the tubular strip, and one object of the present invention is to provide a simple cutting device which will rapidly and evenly sever the strip crosswise thereof. While the invention is especially useful in machines of the type described, nevertheless it may be used wherever fabric is to be cut. For instance, a device such as is described herein may be placed upon a counter in a store where fabric is sold in various lengths from the piece, so that measured lengths of the fabric may be quickly severed by an even, smooth cutting action.

The device includes means which will draw the fabric tightly across the path of the cutting member and, preferably, the stretching means acts progressively as the device moves across the fabric and holds that portion of the fabric tight which is at the moment being acted upon by the knife. In one form of the invention I also provide means for temporarily holding the severed end of the fabric in line with the cutting device to prevent it from falling away until the fabric is drawn again across the path of the cutting device for a succeeding operation. In one form of my invention I have shown the cutting knife as having a movement only transversely of the fabric, whereas in another form of the invention I provide means for rapidly reciprocating the knife while it is passing across the fabric, in order to give a sawing action to the knife edge during the cutting. Other features and advantages will be apparent from the following detailed description of my invention.

In the drawings forming part of this application,

Figure 3:
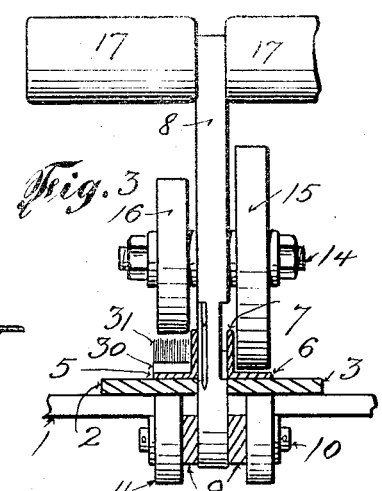
Figure 3 is a sectional view taken on the line 3—3 of Figure 2.
Figure 5:
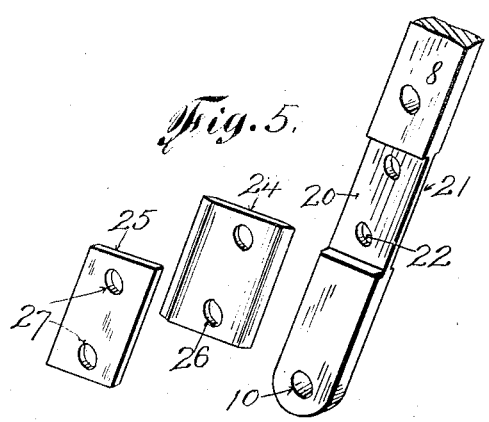
Figure 4:
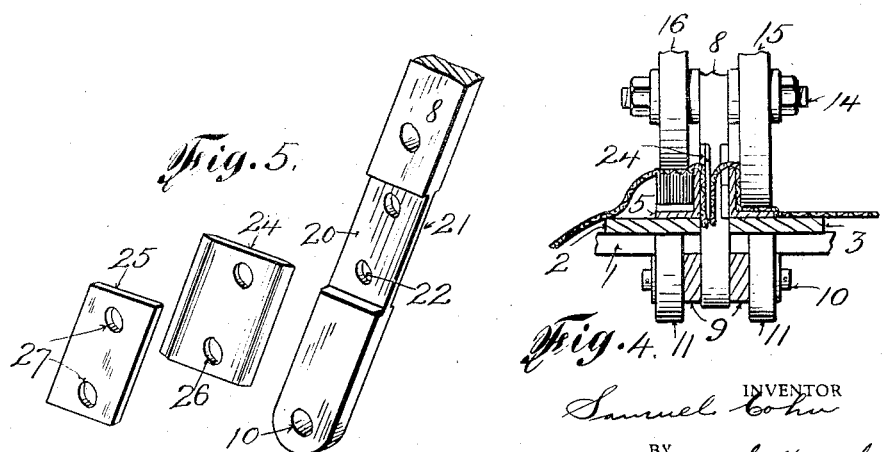

Figure 4 is a sectional view of parts shown in Figure 3, illustrating the fabric during the cutting operation, Figure 5 is a group perspective view of the knife and its holder, Figure 6 is a side elevation of a modified construction in which the knife is made to reciprocate, Figure 7 is a sectional view taken on the line 7—7 of Figure 6, Figure 8 is an inverted plan view of the device shown in Figure 6, Figure 9 is a sectional view of a device with the means for holding the severed end of the fabric omitted, Figure 10 is a group view showing details of various parts, and Figure 11 is a sectional view taken on the line 11—11 of Figure 6.

Figure 1:
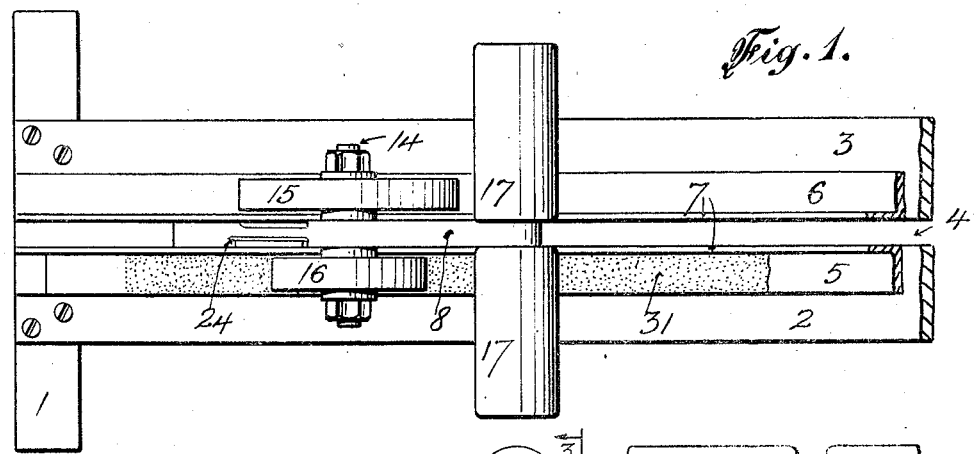
Figure 1 is a plan view of a device embodying my invention.

Referring first to the form of device shown in Figures 1 to 4 inclusive, I have shown a longitudinal supporting member 1 and it will be understood that a similar supporting member is arranged at some distance from it and parallel to it, and on these supporting members are secured the bars 2, 3 in parallel, spaced relation, forming a gap 4 between them. On the members 2, 3 there are provided two rails 5, 6 preferably of L shape in cross section and made of metal, and these members are attached permanently to the supporting bars 2, 3. Each rail 5, 6 has an upstanding web 7 the corresponding webs of the two rails being spaced apart, as shown in Figure 1 to provide an open path for the movement of the knife and to form a space across which the portion of the fabric to be cut may be spanned. The top edges of these two vertical webs of the rails are preferably arranged in the same horizontal plane and the fabric to be severed is adapted to be stretched across these two edges at the moment the knife is acting upon the fabric.

There is a carriage with which the knife travels and I have shown this carriage as consisting of a vertically extending arm 8 which passes through the gap 4 between the rails 2, 3 and at its lower end this frame member is provided with bars 9 mounted on a horizontal shaft 10; and on the outer side of each of these bars there is a guiding roller 11 both journaled upon the shaft 10 and adapted to roll in contact with the under surfaces of the two supporting bars 2, 3 respectively at opposite sides of the vertical plane passing through the gap 4. The members 9, in the construction herein shown, consist of horizontally extending bars the opposite ends of which carry a shaft 12 disposed parallel to the shaft 10. Upon this second shaft are journaled rollers 13 corresponding with the rollers 11 and they are also adapted to roll in contact with the under surfaces of the supportnig bars 2, 3.

The frame member 8 is provided with a laterally extending shaft 14 fixed thereto above the cutting rails; and on this shaft there is mounted a roller 15 which is of sufficient diameter to extend down to a point adjacent the horizontal web of the rail 6; and one face of this roller is adapted to lie adjacent the outer surface of the vertical web 7 of this rail. Preferably, this roller is made partly or wholly of rubber so that it will more firmly press the fabric in the manner hereinafter described. There is another roller 16 arranged on the shaft 14 and this extends downwardly so that it projects below the top edge of the vertical web 7 of the rail 5 and its face lies close to the outer surface of this vertical web. This roller is preferably made partly or wholly of rubber.

The frame member 8 is shown provided with outwardly extending handles 17 mounted on a stud 18 at the upper end of the frame member. By means of the handle members the frame is adapted to be propelled along the supporting and cutting rails. The frame member 8 is provided with recesses 20, 21 on the side faces thereof and there are apertures 22 through the recessed portion of the frame to receive screws 23. The cutting blade 24, shown in Figure 5, may be an ordinary double edge safety razor blade having screw holes 26 therein. There is a clamping plate 25 provided with similar holes 27 for clamping the blade against the frame member. In assembling the knife the blade 24 is first inserted into one of the recesses 20, 21 on the face of the frame member; the clamping plate 25 is then placed against the blade, whereupon the outer surface of the clamping plate 25 lies flush with the face of the frame member; and the bolts 23 are inserted to secure the clamping plate and blade to the frame member. By providing the recesses 20, 21 in each side of the frame member the cutting blade may be so reversed as to use four different portions of the cutting edges in the cutting operations before the blade requires resharpening. By this I mean that the blade 24 may be placed in the socket 20 and used in that position and then inverted or turned from top to bottom for a second use; and it may afterwards be placed in the opposite socket 21 and reversed from top to bottom to utilize two additional portions of the cutting edges.

Figure 2:
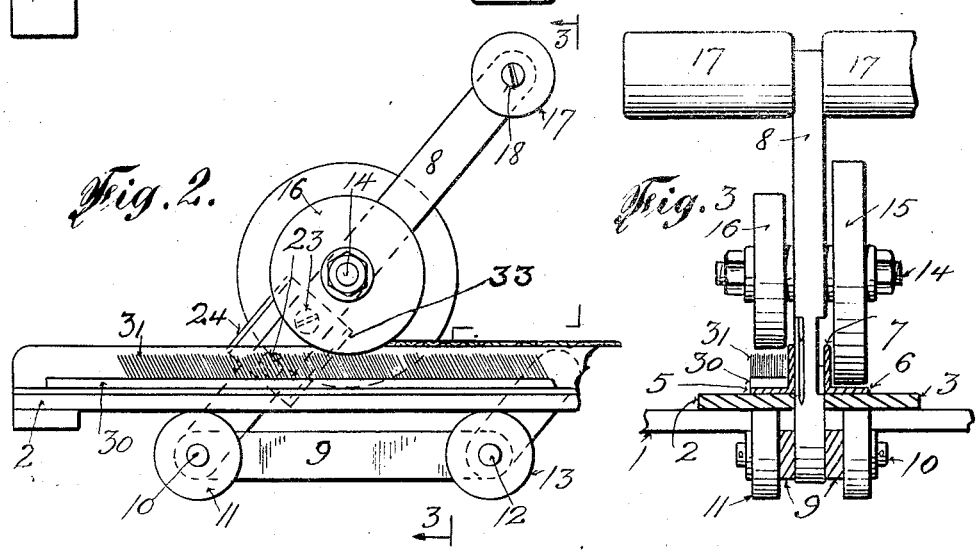
Figure 2 is a side elevation thereof.

It will be noted that the rollers 15, 16 as shown in Figure 2 are arranged in a vertical plane which is between the vertical planes of the rollers 11, 13 which latter engage the under side of the supporting bars 2, 3. This will prevent the carriage from tilting. It will be understood that when no fabric is in position for cutting, the roller 15 will travel on the horizontal web of the rail 6 and when the fabric is in the position for cutting, this roller will rest upon a portion of the fabric as is illustrated in Figure 4.

In the form of the invention shown in Figures 1 to 4 I have provided means for temporarily holding the severed end of the fabric which still remains a part of the long piece from which a section has been severed. For this purpose I have shown an inverted brush comprising a back 30 having a series of upwardly extending bristles 31 the brush being arranged along the top surface of the horizontal web of the rail 5 and close to the side of the vertical web 7 of this rail. The roller 16 is adapted to press a portion of the fabric against the tops of the bristles 31. The bristles 31 may be made of wire if desired.

*Operation*

The strip of fabric to be cut is drawn across the tops of the rails 5, 6 the cutting device or carriage being shifted to one side while the fabric is being placed in position.

When the fabric has been laid across the tops of the webs 7 the operator may grasp the handles 17 and move the cutting device to the right in Figure 2. The rollers 15 and 16 will press downwardly on the fabric at each side of the two vertical webs 7 and as these rollers are made of rubber or rubber covered, they tend to press the fabric without slippage, so that the portion which spans the members 7 is drawn tightly across the open space between these two webs and at a point adjacent the cutting action. As shown in Figure 2, the rollers 15 and 16 gradually press down on the fabric at opposite sides of the vertical webs 7, so that the portion which is opposite the point of cutting is stretched to the extreme. As the carriage moves along in a direction transversely of the strip of fabric which is being cut, it is guided at the bottom by the rollers 11 and 13 engaging the bars 2 and 3, and the carriage is supported from above by the rollers 15 and 16. The latter rollers not only press the fabric downwardly on opposite sides of the two webs 7 but their side faces are close to the outer surfaces of these webs, so that they press the fabric against these in order to have sufficient grip on the fabric to prevent it from being drawn back by the knife. It will be understood that in cutting knitted fabric, which is very elastic, this gripping action by the rollers 15, 16 is necessary to prevent the knife pulling the fabric out of position. As the carriage moves to the right in Figure 2, the knife 24 has one edge presented to the fabric at an obtuse angle, so that the point of cutting is about at 33 with the cutting pressure of the blade directed slightly downwardly of the plane of the fabric. As the fabric is always stretched tight at the point of cutting, a clean cut is made. As the carriage progresses across the bars 5, 6 the pressing action of the rollers 15, 16 for tightening the fabric progresses with the cutting action, so that it is not necessary to tighten the fabric over its full width for the cutting operation. Where the holding device, comprising the brush 30, 31 is employed, the roller 16 not only serves to stretch the fabric, but the portion thereof lying on one side of the rail 5, which is the portion from which the severed piece is removed, presses the end of the severed fabric onto the bristles 31 so that when the cutting device has completed its operation one end of the fabric will remain engaged with the bristles 31. The carriage and cutting device may then be moved back to the starting position and the end of the fabric which is engaged with the bristles 31 may then be lifted off the brush and carried forward across the rails 5, 6 to be positioned for another cutting action. This brush device, therefore, serves to hold the end of the fabric after each cutting operation to prevent the severed end of the fabric from dropping out of position. In Figure 4 I have shown the manner in which the fabric is gripped by the rollers 15, 16 and the manner in which the knife severs the portion of the fabric which is tightly spanned across the webs 7.

In Figure 9 I have shown the same construction as that just described, except that the rollers 34 on opposite sides of the rails 2, 3 are alike and the brush device for holding the end of the severed fabric is omitted.

In Figures 6 to 8, 10 and 11 I have shown a modified construction in which the cutting knife is given a reciprocating stroke to facilitate the rapid cutting of the fabric. In this construction I have shown the frame member 35 corresponding in most respects with the frame member 8 of the previous construction; and it has a shaft 36 on which the rollers 37, 38 are carried for co-operating with the rails 2', 3' the same as in the first described construction. There is a bar 39 at each side of the lower end of the frame member 35 and the shaft 40 is journaled through the lower end of the frame member 35 and one end of each of the bars 39. There is a roller 41 on one end of this shaft and outside of the bar 39, which roller engages the under surface of the supporting bar 3' and corresponds with one of the rollers 11 in the first construction. On the opposite side of the frame member 35 and mounted on the shaft 40 there is a gear wheel 42 which meshes with the teeth 43 of a rack bar 44 arranged in inverted position on the under side of the supporting bar 2' of the stationary structure. There is a cam race 45 formed in one face of the gear 42 which is disposed eccentrically in relation to the shaft 40.

The knife in this construction is attached to one side of a sleeve 46 which encircles the frame member 35 on which the sleeve is adapted to reciprocate in the direction of the length of the frame member. Preferably the knife is clamped against the outer surface of this sleeve by means of a plate 47 which is held tightly upon the knife blade by means of the screws 48. The sleeve projects downwardly through the gap 4 and lies adjacent that face of the gear 42 which has the cam race 45 and at its lower end there is a laterally projecting pin 49 which extends into the cam race 45. In this form of the invention the bars 39 also extend some distance from the shaft 40 and their opposite ends carry a lateral shaft 50 on which are mounted the rollers 51 to engage the under surfaces of the supporting bars 2', 3' and they serve the same purpose as the rollers 13 in the first form.

The operation of this type of device is very similar to the first form. The fabric is laid across the vertical webs 7 while the carriage is at one side of the stationary frame; and after the fabric has been placed in position for cutting the carriage is moved along the supporting rails crosswise of the fabric and to the right in Figure 6. The rollers 34 will progressively act upon the fabric to stretch it across the tops of the vertical webs 7' and the edge of the knife blade which lies at an acute angle to the plane of the fabric will cut the stretched portion of the fabric. As the carriage moves along the supporting structure, the gear 42, engaging in the teeth of the rack 44 will be caused to revolve, and the cam race 45 will act on the pin 49 and cause the sleeve 46, together with the knife, to be reciprocated along the carriage member 35 and this will cause the knife blade to cut the fabric while reciprocating. This produces a sawing action which will speed the cutting and allow the carriage to be moved rapidly while the cutting operation is being performed. In other respects this form of the invention operates the same as the first form. The parts shown in these figures designated by primed numerals correspond with the parts bearing corresponding unprimed numerals in the device of Figures 1 to 6.

From the above it will be apparent that I have provided a simple cutting device which progressively stretches the fabric across the holding members or rails 5, 6 in position to be severed by the knife as it progresses laterally across the strip of fabric. The present device will produce the necessary tightening tension in the fabric for a rapid cutting operation, especially because the fabric is only tightened locally at the point of cutting. The local stretching, however, is performed in such manner that a straight cut may be made across the fabric. While I have described my invention as particularly adapted for cutting knitted textile fabric, nevertheless it is to be understood that it may be used for cutting any other kind of material where it is desired to stretch the material during the cutting operation, or at least hold it taut.

Having described my invention, what I claim is:

1. A device for cutting textile fabric or other material, comprising a support, means on which the material is adapted to be stretched, a carriage movable in relation to said support and having means operating progressively on the material and adapted to co-operate with said stretching means to draw the material taut, and a cutting member acting progressively on the taut portion of the material to sever the same as the carriage is moved across the material.

2. A device for cutting textile fabric or other material, comprising a support, means on which the material is adapted to be stretched, a carriage movable in relation to said support and having revolving means operating progressively on the material and co-operating with said stretching means to draw the same taut, and a cutting member acting progressively on the taut portion of the material to sever the same as the carriage is moved across the material.

3. A device for cutting textile fabric or other material, comprising a support, means on which the material is adapted to be stretched, a carriage movable in relation to said support and having revolvable rubber members operating progressively on the material and cooperating with said stretching means to draw the same taut, and a cutting member acting progressively on the taut portion of the material to sever the same as the carriage is moved across the material.

4. A device for cutting textile fabric or other material, comprising a support, spaced members over which the material is adapted to be stretched, a carriage movable in relation to said support and having means operating progressively on the material and co-operating with said spaced members to draw the material taut, and a cutting member arranged between said stretching members and acting progressively on the taut portion of the material to sever the same as the carriage is moved across the material.

5. A device for cutting textile fabric or other material, comprising a support, spaced members on which the material is adapted to be stretched, a carriage movable in relation to said support, and having revolving means co-operating with said stretching members and acting progressively on the material to draw the same taut, and a cutting member traveling between said stretching members and acting progressively on the taut portion of the material to sever the same as the carriage is moved across the material.

6. A device for cutting textile fabric or other material, comprising a support, spaced members on which the material is adapted to be stretched, a carriage movable in relation to said support and having a member moving between said spaced stretching members, revolving means on said carriage co-operating with said stretching members and acting progressively on the material to draw the same taut and a cutting member on said carriage acting progressively on the taut portion of the material as the carriage is moved.

7. A device for cutting textile fabric or other material, comprising a support, spaced members on which the material is adapted to be stretched, a carriage movable in relation to said support, revolving means on said carriage for pressing the material downwardly at opposite sides of said stretching members to draw the material taut, and a cutting member on said carriage for cutting the taut portion of the material.

8. A device for cutting textile fabric or other material, comprising a support, spaced members on which the material is adapted to be stretched, a carriage movable in relation to said support, revolving members on said carriage arranged to press the material downwardly at opposite sides of said stretching members and having their side faces substantially parallel and close to the side faces of said stretching members, and a cutting member on said carriage adapted to act upon the stretched portion of the material.

9. A device for cutting textile fabric or other material, comprising a support, spaced members on which the material is adapted to be stretched, a carriage movable in relation to said support, revolving members on said carriage, having rubber surfaces, and arranged to press the material downwardly at opposite sides of said stretching members to progressively draw the material taut, and a cutting member on said carriage acting on the taut portion of the material.

10. A device for cutting textile fabric or other material, comprising a support, spaced parallel bars having stretching edges, a carriage movable in relation to said support, parallel rollers on said carriage adjacent the opposite, outer surfaces of said bars and arranged to press the material onto said bars to draw it taut between them, and a cutting member on said carriage operating on the taut portion of the material.

11. A device of the class described, including spaced, parallel supports having stretching members, a carriage having a member extending through the gap between said supports and having rollers above and below and co-operating with said supports, certain of said rollers co-operating with said stretching members to draw the material between them taut, and a cutting member on said carriage, moving between said stretching members to cut the taut portion of the material.

12. A device of the class described including spaced, parallel supports having spaced stretching members, a carriage having a member extending through the gap between said supports and having means above and below said supports and co-operating therewith and including members co-operating with said stretching members to progressively draw the material taut, and a plural edged cutting member reversibly mounted on said carriage with its cutting edge arranged obliquely to the plane of the taut portion of the material.

13. A device for cutting material, comprising a support, members over which the material is adapted to be drawn taut, a carriage movable in relation to said support and having means operating progressively on the material and cooperating with said members to draw the material taut, a cutting member on said carriage acting progressively on the taut portion of the material, and means for causing said cutting member to move in relation to the carriage to move its cutting edge in relation to the material.

14. A device for cutting material, comprising a support, members over which the material is adapted to be drawn taut, a carriage movable in relation to said support and having means operating progressively on the material and cooperating with said members to draw the material taut, a cutting member on said carriage acting progressively on the taut portion of the material, and means for reciprocating said cutting member.

15. A device for cutting material, comprising a support, members over which the material is adapted to be drawn taut, a carriage movable in relation to said support and having means operating progressively on the material and cooperating with said members to draw the material taut, a cutting member on said carriage acting progressively on the taut portion of the material, and means for reciprocating said cutting member, comprising a rack, a gear on said carriage co-operating with the rack, and means whereby said gear operates to reciprocate the cutting member as the carriage is moved.

Signed at the city, county and State of New York the 2nd day of February, 1928.

SAMUEL COHN.